United States Patent [19]
Inazuka et al.

[11] 3,929,819
[45] Dec. 30, 1975

[54] UROCANIC ACID AMIDE DERIVATIVES

[75] Inventors: Shinichi Inazuka, Tokyo; Sadayoshi Ninagawa, Yokohama, both of Japan

[73] Assignee: Ajinomoto Co., Inc., Tokyo, Japan

[22] Filed: Oct. 26, 1973

[21] Appl. No.: 410,178

[30] Foreign Application Priority Data
Nov. 1, 1972  Japan.............................. 47-109665

[52] U.S. Cl............... 260/309; 260/240 J; 260/999; 424/59
[51] Int. Cl.².......................................... C07D 233/64
[58] Field of Search........................ 260/309, 240 J

[56] References Cited
FOREIGN PATENTS OR APPLICATIONS
1,555,992  12/1968  France................................ 260/309

OTHER PUBLICATIONS
Hoff et al., Chem. Abst., Vol. 78, No. 43480j, (1973).

*Primary Examiner*—Natalie Trousof
*Attorney, Agent, or Firm*—Hans Berman

[57] ABSTRACT

Urocanic acid amides, in which the amide nitrogen may carry substituents, absorb ultraviolet light of greater wavelength than the free acid and thereby are more effective for shielding sensitive materials, including the human body, from the chemically most effective portion of the solar ultraviolet spectrum. The amides are more readily soluble in water than the free acid and more stable than the soluble salts of the acid.

7 Claims, No Drawings

UROCANIC ACID AMIDE DERIVATIVES

This invention relates to screening agents absorbing ultraviolet lightt, and particularly to ultraviolet absorbing derivatives of urocanic acid.

Urocanic acid absorbs a portion of the solar ultraviolet spectrum and has been proposed as an ingredient in cosmetic compositions for protecting the human body against sunburn. Its applications have been limited by the fact that it is practically insoluble in water, oils, fats, and organic solvents, by its instability in alkaline media, and by its growth promoting effect on molds in cosmetic compositions.

The alkali metal salts of urocanic acid are water soluble, but they are not stable in aqueous solution and cause discoloration of the solutions. It has been attempted to stabilize solutions of urocanic acid by addition of triethanolamine or aluminum chloride (Japanese Patent Publications Nos. 38633/1970 and 38711/1970), but the stabilizing agents irritate the skin or interfere with emulsification of cosmetic products containing the agents.

It has now been found that amide derivatives of urocanic acid and acid addition salts of such amides are free from the shortcomings of urocanic acid and its known derivatives, and have more favorable absorption characteristics for ultraviolet light.

The amides of the invention have the formula

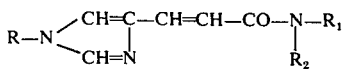

wherein R is hydrogen, alkyl having 1 to 22 carbon atoms or alkanoyl having 2 to 22 carbon atoms; $R_1$ and $R_2$ are hydrogen, alkyl, alkenyl, aminoalkyl, hydroxyalkyl, guanyl, or jointly constitute a heterocyclic ring of 3 to 6 members with the amido nitrogen, alkyl in said $R_1$ and $R_2$ having up to 18 carbon atoms.

More specifically, the invention relates to amides of the above formula and cosmetically acceptable acid addition salts of the amides wherein R is hydrogen, alkyl of 1 to 22 carbon atoms, or alkanoyl of 2 to 22 carbon atoms, $R_1$ and $R_2$ are hydrogen or alkyl or hydroxyalkyl each of up to 18 carbon atoms.

Urocanic acid dodecylamide, one of the presently preferred, typical compounds of this invention, is very soluble in water, even at pH 6 to 8, methanol, ethanol, and chloroform; soluble in benzene, acetone, glycerol, propylene glycol, polyethylene glycol (m.w. 400), silicone oil, olive oil, castor oil, tsubaki oil, peanut oil, cotton seed oil, and petrolatum; and slightly soluble in ethyl ether, and n-hexane. The other amides of the invention are similarly soluble. The solubility scale employed is that of the Handbook of Chemistry and Physics (The Chemical Rubber Co., Cleveland, Ohio), and urocanic acid is insoluble according to the same scale in all the solvents mentioned.

The amides of the invention and their salts strongly absorb solar ultraviolet light in the physiologically and chemically most active range of wavelengths from about 270 to 320 millimicrons while urocanic acid is effective only in the lowermost portion of this range and has a sharp absorption peak at the relatively unimportant wave length of 270 millimicron.

Absorption data in percent for 0.001% ethanol solutions of urocanic acid (UA) and urocanic acid dodecylamide (UAD) at wavelengths from 260 to 330 millimicrons are juxtaposed below. They were determined under identical conditions.

| Wavelength, mµ | 260 | 270 | 280 | 290 | 300 | 310 | 320 | 330 |
|---|---|---|---|---|---|---|---|---|
| UA, % | 72 | 80 | 51 | 20 | 3 | 0 | 0 | 0 |
| UAD, % | 21 | 36 | 48 | 52 | 46 | 31 | 10 | 1 |

Results comparable to those indicated above are obtained with the other amides of the invention and with the salts of the amides.

At the wavelengths most important for preventing sunburn, a 0.02% solution of urocanic acid dodecylamide in ethanol absorbs 5 to 6 times as much solar ultraviolet radiation as a corresponding solution of p-aminobenzoic acid. In 0.02% aqueous solution, the absorbancy of the amide is 100 times that of p-aminobenzoic acid which is commonly employed in sunburn preventives.

The amides and amide salts of the invention do not promote growth of molds, but actually inhibit the growth of many microorganisms. They are antioxidants, have insecticidal effects, and inhibit corrosion of some metals. They are chemically and thermally much more stable than urocanic acid. The amides and their salts thus find an obvious field of application not only in the cosmetics industry, but also as stabilizing ingredients in plastics, printing inks, and textile finishing compositions exposed to sunlight during normal service.

The amides of the invention are readily prepared from the lower alkyl esters of urocanic acid and its $N^1$-derivatives and amines having at least one available hydrogen atom on the amine nitrogen, and the esters in turn are prepared without difficulty from the free acids by esterification with lower alkanols in the presence of acid catalysts. The $N^1$-alkyl and $N^1$-alkanoyl derivatives of urocanic acid are obtained in a conventional manner by reacting urocanic acid with alkyl halides having 1 to 22 carbon atoms and alkanoyl halides having 2 to 22 carbon atoms.

The esters of urocanic acid and of its $N^1$-derivatives with lower alkanols may be reacted as such with ammonia, primary or secondary amines, or in the form of their acid addition salts with inorganic or organic acids. Alkaline catalysts are helpful, but not absolutely required. Tertiary amines are effective catalysts, and triethylamine is most conveniently available for this purpose.

The amines which promptly react with the esters of urocanic acid and of its $N^1$-derivatives include, but are not limited to, methylamine, dimethylamine, ethylamine, diethylamine, and the corresponding propyl, butyl, penyl, hexyl, heptyl, octyl, decyl, dodecyl, tetradecyl, hexadecyl, heptadecyl, and octadecylamines; also hydroxyalkylamines such as ethanolamine, diethanolamine, and β-hydroxydodecylamine; alkenyl amines such as pentenylamine, decenylamine; cyclic amines having 3 to 6 ring members such as morpholine, imidazole, imidazoline, ethyleneimine, pyrrole, and pyrrolidine; polyamines such as methylenediamine, ethylenediamine, propylenediamine, hexylenediamine, guanidine; and ammonia.

The reaction is preferably carried out in the presence of a solvent inert to the reactants and to the product, such as methanol, ethanol, propanol, butanol, benzene, toluene, xylene, carbon tetrachloride, dimethylformamide, or n-hexane, but does not necessarily require a solvent. The reaction temperature is chosen between 10° and about 100°C to avoid discoloration of the reaction product while achieving an adequate reaction rate. The reaction zone may be open to the atmosphere.

The acid addition salts may be formed directly in the reaction mixture, or the amide may be recovered and then converted to the salt by reaction with the required amount of acid in a manner conventional in itself.

Acid addition salts of the amides of the invention which combine excellent solubility in water with the desirable properties of the free amides are readily prepared from a wide variety of acids which include all the common inorganic acids such as hydrochloric acid, sulfuric acid, phosphoric acid, silicic acid, and boric acid, as well as organic acids such as the monocarboxylic aliphatic acids having up to seventeen carbon atoms in saturated or unsaturated carbon chains, pyrrolidonecarboxylic acid, the saturated, aliphatic, dicarboxylic acids such as oxalic and succinic acid, hydroxycarboxylic acids, such as malic, tartaric, ascorbic, and citric acid, aromatic carboxylic acids including such relatively complex acids as gallic and ferulic acid, and aromatic sulfonic acids, such as p-toluenesulfonic acid and benzenesulfonic acid. Obviously, this list can be extended at will to include innumerable other acids whose addition salts with the amides of the invention are water soluble. The acid moieties in the acid addition salts of this invention thus will be selected freely for the desired application considering mainly the convenience and economy of the salts.

The following Examples illustrate the preparation of ultraviolet absorbing compounds of the invention:

EXAMPLE 1

20 g Urocanic acid methyl ester hydrochloride and 12 g triethylamine were dissolved in 100 ml methanol, and 20 g dodecylamine was added to the solution with stirring. The mixture was refluxed for one hour and then permitted to cool, whereby triethylamine hydrochloride was precipitated. The precipitate was removed by filtering, and the filtrate was partly evaporated in a vacuum to remove additional triethylamine and methanol. Petroleum ether was added to the residue, whereby urocanic acid dodecylamide was crystallized. When recrystallized from benzene, the pure product weighed 30.8 g, melted at 118° to 120°C, and was identified by elementary analysis:

Calculated for $C_{18}H_{31}N_3O$: 70.8% C, 10.2% H, 13.7% N; Found: 70.7 C, 10.3 H, 13.5 N.

EXAMPLE 2

10 g Urocanic acid dodecylamide was dissolved in methanol, and gaseous hydrogen chloride was bubbled through the solution until no further absorption could be observed. The methanol and excessive hydrogen chloride were distilled off, the residue was washed with petroleum ether to cause crystallization, and then recrystallized from benzene. The purified material consisted of urocanic acid dodecylamide hydrochloride weighing 11.3 g and melting at 221° - 223°C. It was identified by elementary analysis:

Calculated for $C_{18}H_{32}N_3OCl$: 63.3% C, 9.4% H, 12.3% N, 10.4% Cl; Found: 63.2 C, 9.4 H, 12.1; N, 11.0.

EXAMPLE 3

20 g Urocanic acid methyl ester hydrochloride and 12 g triethylamine were dissolved in 100 ml methanol. 11.2 g Diethanolamine was added with stirring, and the resulting mixture was refluxed for one hour. After cooling, triethylamine hydrochloride was filtered off, and the filtrate was partly evaporated in a vacuum. The residue was dissolved in methanol, and the solution was saturated with gaseous hydrogen chloride. It was then evaporated to remove the solvent and an excess of hydrogen chloride, the residue was washed with petroleum ether and recrystallized from benzene.

It weighed 27.7 g, melted at 212° - 216°C, and was identified as the pure hydrochloric acid addition salt of urocanic acid diethanolamide by elementary analysis:

Calculated for $C_{10}H_{15}N_3O_3 \cdot HCl$: 50.0% C, 6.5% H, 16.1% N; Found: 49.8 C, 6.4 H, 15.9 N.

EXAMPLE 4

Equimolecular amounts of urocanic acid dodecylamide and of pyrrolidonecarboxylic acid were combined in methanol solution, and the solvent was evaporated to produce the crystalline pyrrolidonecarboxylic acid addition salt of urocanic acid dodecylamide. The salt melted at 122° - 125°C, and was identified by elementary analysis:

Calculated for $C_{23}H_{38}N_4O_4$: 63.5% C, 9.1% H, 12.9% N; Found 63.3 C, 9.1 H, 12.7 N.

EXAMPLE 5

The procedure of Example 1 was repeated with N-methylurocanic acid methyl ester hydrochloride replacing an equimolecular amount of the unsubstituted ester salt. N-Methylurocanic acid dodecylamide was obtained in a comparable yield and melted at 119° to 121°C. It was identified by elementary analysis:

Calculated for $C_{19}H_{33}N_3O$: 71.5% C, 10.3% H, 13.2% N; Found: 71.3 C, 10.4 H, 13.1 N.

EXAMPLE 6

When N-acetylurocanic acid methyl ester hydrochloride was substituted in Example 1 for an equimolecular amount of the urocanic acid ester salt, N-acetylurocanic acid dodecylamide was obtained as a crystalline material melting at 188° to 189°C. It was identified by elementary analysis:

Calculated for $C_{20}H_{33}N_3O$: 69.2% C, 9.5% H, 12.1% N; Found: 69.1 C, 9.5 H, 12.1 N.

Homologs and analogs of the compounds described in Examples 1 to 6 are readily prepared by the same methods.

What is claimed is:

1. A compound which is an amide of the formula $$R-N{\overset{\displaystyle CH=C-CH=CH-CO-N-R_1}{\underset{\displaystyle CH=N}{}}}{\overset{}{\underset{\displaystyle R_2}{}}}$$

or a cosmetically acceptable acid addition salt thereof, in said formula R being hydrogen, alkyl of 1 to 22 carbon atoms or alkanoyl of 2 to 22 carbon atoms, $R_1$ and $R_2$ being hydrogen or alkyl or hydroxyalkyl each of up to 18 carbon atoms.

2. A compound as set forth in claim 1, wherein $R_1$ is hydrogen, and $R_2$ dodecyl.

3. A compound as set forth in claim 2, wherein R is hydrogen, methyl, or acetyl, said compound being an amide or a hydrochloric acid addition salt of said amide.

4. A compound as set forth in claim 1, wherein $R_1$ and $R_2$ are hydroxyethyl.

5. A compound as set forth in claim 4, wherein R is hydrogen, said compound being a hydrochloric acid addition salt of said amide.

6. A compound as set forth in claim 1 which is a pyrrolidonecarboxylic acid addition salt of said amide.

7. A compound as set forth in claim 6, wherein R and $R_1$ are hydrogen, and $R_2$ is dodecyl.

* * * * *